(12) United States Patent
Stanczak et al.

(10) Patent No.: US 9,376,067 B2
(45) Date of Patent: Jun. 28, 2016

(54) VEHICLE INTERIOR TRIM ASSEMBLY

(71) Applicant: Nissan North America, Inc., Franklin, TN (US)

(72) Inventors: Matthew Stanczak, Troy, MI (US); Tetsu Satou, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 10 days.

(21) Appl. No.: 14/532,784

(22) Filed: Nov. 4, 2014

(65) Prior Publication Data

US 2016/0121810 A1 May 5, 2016

(51) Int. Cl.
*B62D 39/00* (2006.01)
*B60R 13/02* (2006.01)

(52) U.S. Cl.
CPC .......... *B60R 13/0206* (2013.01); *B60R 13/0243* (2013.01); *B60R 2013/0293* (2013.01)

(58) Field of Classification Search
CPC ............ B60R 13/0206; B60R 13/0243; B60R 2013/0293
See application file for complete search history.

(56) References Cited

U.S. PATENT DOCUMENTS

| | | |
|---|---|---|
| 5,340,149 A | 8/1994 | Gajewski |
| 7,380,821 B2 | 6/2008 | Higuchi |
| 8,128,145 B2 | 3/2012 | Smith et al. |
| 8,469,428 B1 | 6/2013 | Tobey et al. |
| 8,720,118 B2 | 5/2014 | Meyers et al. |
| 8,844,992 B1* | 9/2014 | Noga .................. B60R 13/0206 24/289 |
| 2008/0238112 A1 | 10/2008 | Eberlein et al. |
| 2015/0231999 A1* | 8/2015 | Jadhav ................ B60R 13/0243 296/153 |

FOREIGN PATENT DOCUMENTS

WO    WO 2010081142 A1 *  7/2010  .......... B60R 11/0264

\* cited by examiner

*Primary Examiner* — Lori L Lyjak
(74) *Attorney, Agent, or Firm* — Global IP Counselors, LLP (57) ABSTRACT

A main trim panel has a trim surface, a plurality of first attachment parts and a recessed surface that is spaced apart from the trim surface. The recessed surface defines a flange that includes a first tether attachment part and a plurality of attachment parts. A sub-trim panel has a second tether attachment part and a plurality of fastener parts fixed to the attachment parts of the flange. A tether has a first end attached to the first tether attachment part and a second end attached to the second tether attachment part, such that with the sub-trim panel installed to the main trim panel, the sub-trim panel the covers and conceals the flange, the first tether attachment part and the tether, and with the sub-trim panel un-installed from the main trim panel the tether limits movement of the sub-trim panel relative to the main trim panel.

19 Claims, 7 Drawing Sheets

VEHICLE INTERIOR TRIM ASSEMBLY

BACKGROUND

1. Field of the Invention

The present invention generally relates to a vehicle interior trim assembly. More specifically, the present invention relates to vehicle interior trim assembly that includes a main trim panel and a sub-trim panel that are tethered to one another such that in the event that the two panels become detached from one another, the tether limits movement therebetween.

2. Background Information

SUMMARY

One object of the disclosure is to provide two trim panels that attach to one another with a tether that limits movement of the two trim panels relative to one another if one trim panel becomes detached from other trim panel.

Another object of the disclosure is to provide a main trim panel with a tether attachment part that is visible and easily accessed for attachment of a tether prior to installation a sub-trim panel to the main trim panel, where, once the sub-trim panel is attached to the main trim panel, the sub-trim panel completely covers the tether and the tether attachment part.

In view of the state of the known technology, one aspect of the present disclosure is to provide a vehicle interior trim assembly with a main trim panel, a sub-trim panel and a tether. The main trim panel has a trim surface and an attachment surface opposite the trim surface. The attachment surface includes a plurality of first attachment parts configured to attach to an interior structure of a vehicle. The main trim panel also includes a recessed surface that is spaced apart from the trim surface. The recessed surface defines a flange that at least partially surrounds an opening extending from the recessed surface to the attachment surface. The flange has a first tether attachment part and a plurality of second attachment parts. The sub-trim panel has a finished trim surface and an attachment surface opposite the finished trim surface. The attachment surface includes a second tether attachment part and a plurality of third fastener parts fixed to the second attachment parts of the flange of the main trim panel with the sub-trim panel installed to the main trim panel. The tether has a first end attached to the first tether attachment part and a second end attached to the second tether attachment part. With the sub-trim panel installed to the main trim panel, the sub-trim panel the covers and conceals the flange, the first tether attachment part and the tether. Further, with the sub-trim panel un-installed or separated from the main trim panel the tether limits movement of the sub-trim panel relative to the main trim panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
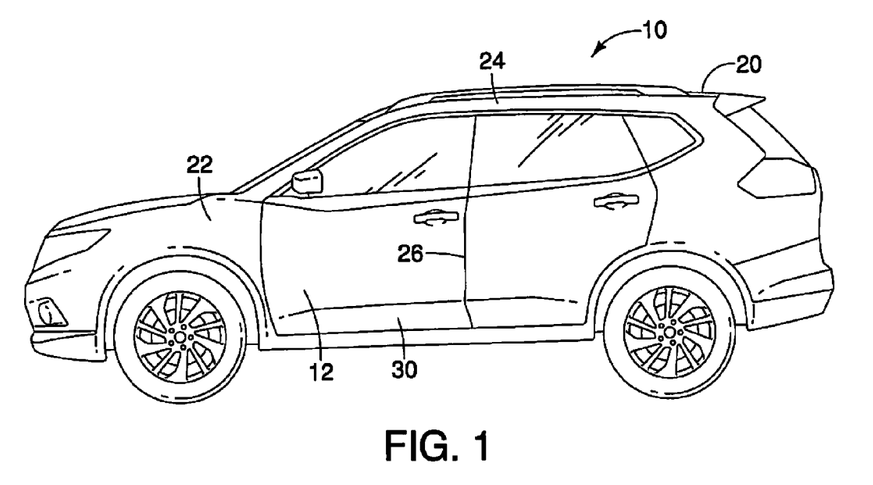
FIG. 1 is a side view of a vehicle that includes a door in accordance with a first embodiment.
Figure 2:
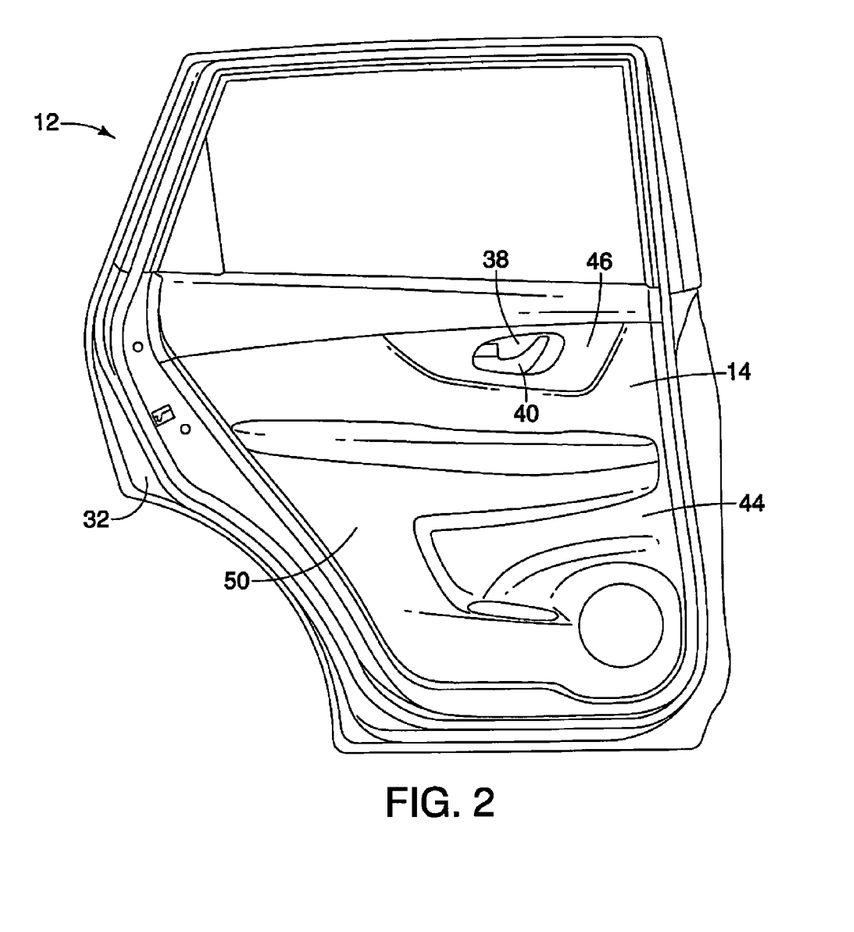
FIG. 2 is a plan view of the door removed from the vehicle, showing an interior trim assembly in accordance with the first embodiment.

Referring initially to FIG. 1, a vehicle 10 that includes a door 12 is illustrated in accordance with a first embodiment. As shown in FIG. 2, the door 12 includes an interior trim assembly 14 that is described in greater detail below.

As shown in FIG. 1, the vehicle 10 includes a vehicle body structure 20 that defines a side structure 22, a roof structure 24 and a door opening 26. The door 12 is part of the vehicle body structure 20 and is supported to the side structure 22 for pivotal movement between an open position (not shown) exposing the door opening 26 and a closed position shown in FIG. 1 covering the door opening 26.

Figure 3:
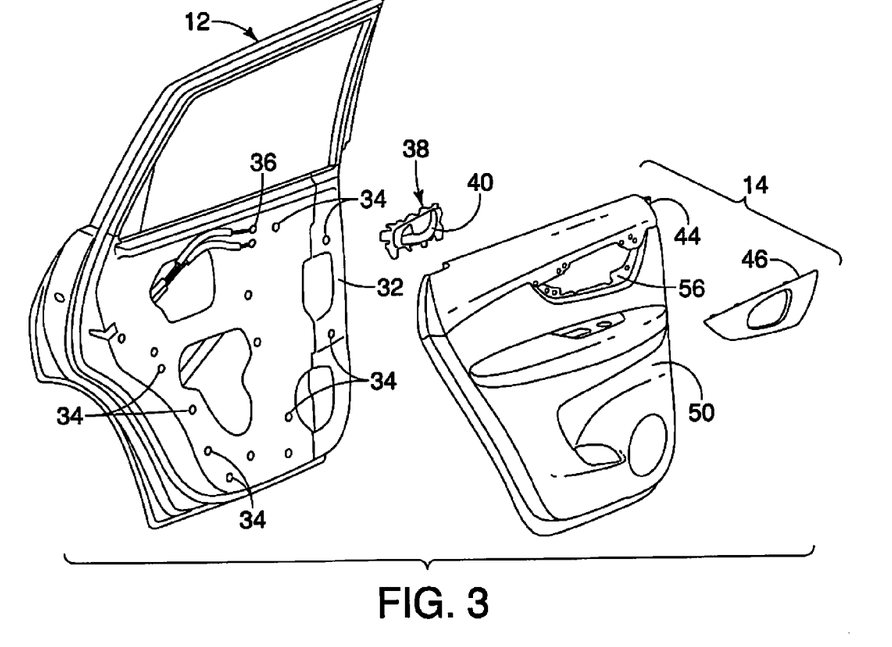
FIG. 3 is an exploded view of the door showing door handle mechanism, along with a main trim panel and a sub-trim panel of the interior trim assembly in accordance with the first embodiment.

The door 12 is shown in FIG. 2 removed from the vehicle body structure 20. The door 12 has an exterior surface 30 shown in FIG. 1 and an interior surface 32 shown in FIGS. 2 and 3. The interior surface 32 includes a plurality of fastener receiving apertures 34 and a handle installation section 36, as shown in FIG. 3. The interior trim assembly 14 attaches to the interior surface via fasteners $F_1$ (FIG. 5) that insert into the fastener receiving apertures 34. Further, a door handle mechanism 38 attaches to the handle installation section 36 of the interior surface 32 of the door 12. The door handle mechanism 38 includes a lever 40.

Figure 4:
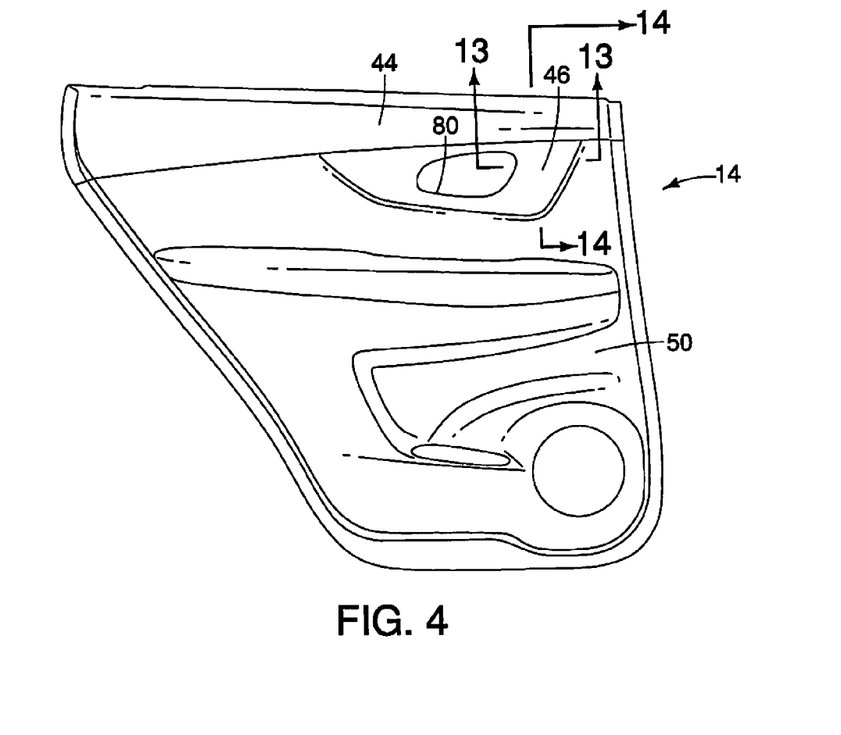
FIG. 4 is a plan view of the interior trim assembly showing finished trim surfaces of the sub-trim panel attached to the main trim panel in accordance with the first embodiment.

As shown in FIGS. 3 and 4, the interior trim assembly 14 basically includes a main trim panel 44 and a sub-trim panel 46. The main trim panel 44 can be a single panel structure that covers a majority of the interior surface 32 of the door 12. However, as indicated in the drawings, the main trim panel 44 can also be formed with a series of panel sections that are attached or otherwise rigidly fixed to one another.

Figure 5:
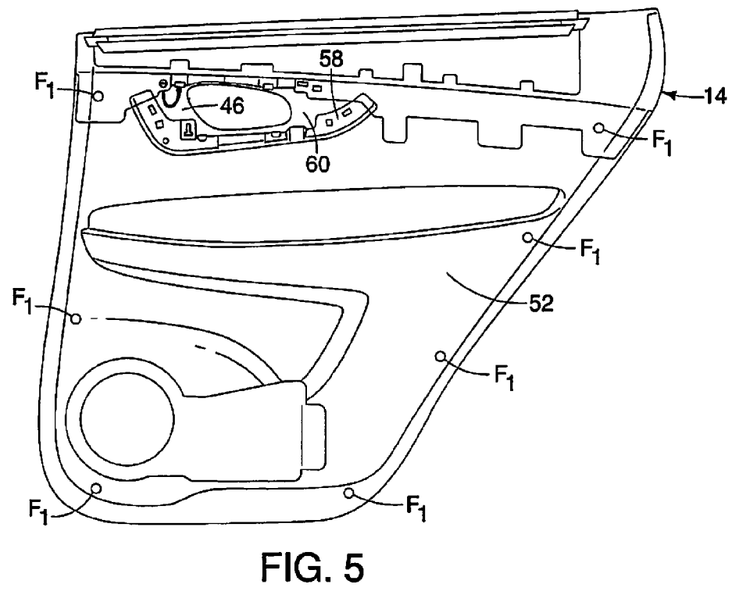
FIG. 5 is a plan view of the interior trim assembly showing attachment surfaces of the sub-trim panel and the main trim panel in accordance with the first embodiment.
Figure 6:
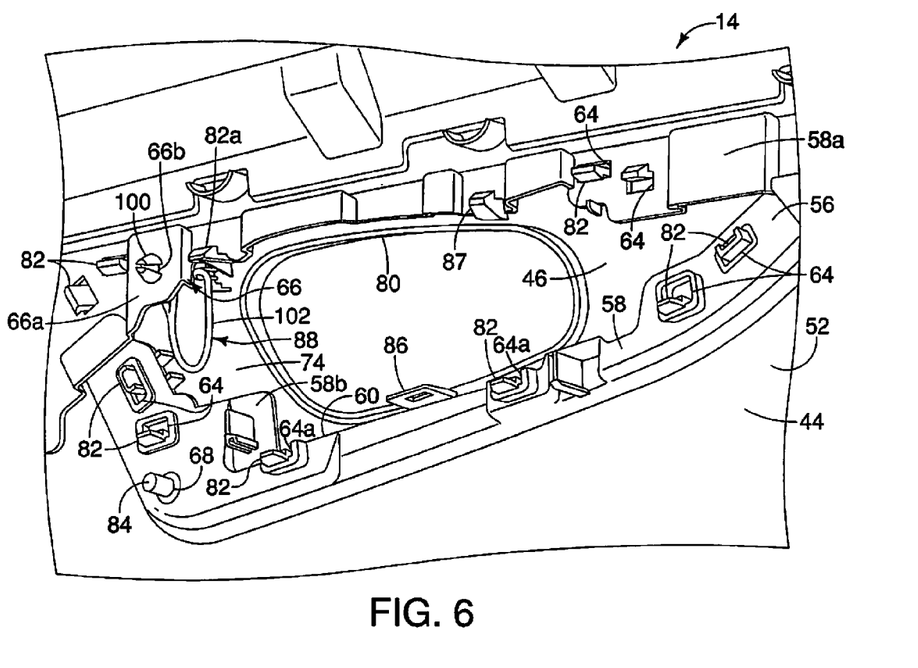
FIG. 6 is a perspective view of the attachment surface of the main trim panel with the sub-trim panel attached thereto in accordance with the first embodiment.
Figure 7:
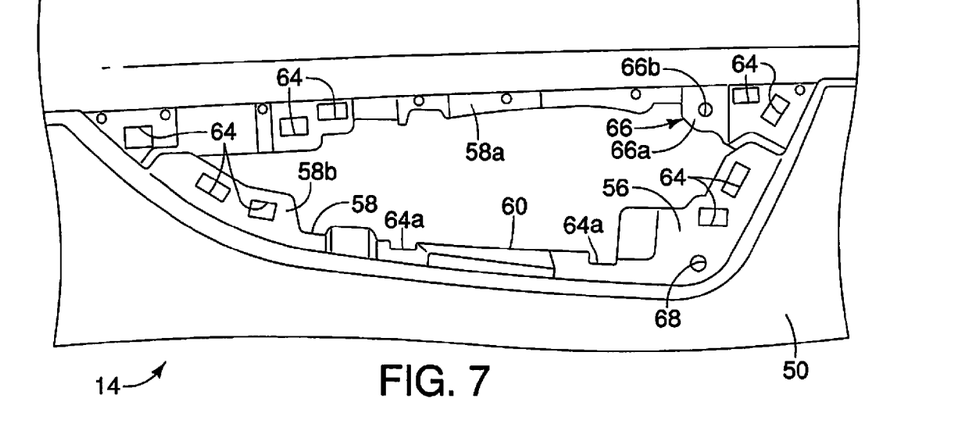
FIG. 7 is a plan view of a portion of the main trim panel showing a recessed surface that includes attachment parts that are employed to attach the sub-trim panel to the main trim panel in accordance with the first embodiment.

The main trim panel 44 has a trim surface 50 shown in FIGS. 4 and 7, and an attachment surface 52 opposite the trim surface 50 shown in FIGS. 5 and 6. The attachment surface 52 includes a plurality of slots (not shown) that each receive one of the plurality of fasteners $F_1$, as shown in FIG. 5. The fasteners $F_1$ (also referred to herein below as first attachment parts) are inserted into respective ones of the fastener receiving apertures 34 of the door 12 in order to attach the main trim panel 44 to the interior surface 32 of the door 12 (an element of the vehicle body structure 20).

As shown in FIGS. 6 and 7, the main trim panel 44 also includes a recessed surface 56 that is located between the trim surface 50 and the attachment surface 52. The recessed surface 56 defines a concaved area of the trim surface 50. The recessed surface 56 also defines a flange 58 that at least partially surrounds an opening 60 within the recessed surface 56. The opening 60 extends from the recessed surface 56 to the attachment surface 52. The flange 58 includes an upper portion 58a and a lower portion 58b. The upper and lower portions 58a and 58b include of the flange 58 include a plurality of attachment parts 64 and 64a (referred to herein below as second attachment parts). The attachment parts 64 are openings in the flange 58 and the attachment parts 64a are recesses along the lower perimeter of the opening 60, as shown in FIGS. 6 and 7. The upper portion 58a of the flange 58 includes a first tether attachment part 66. The first tether attachment part 66 includes an offset flange portion 66a and an aperture 66b formed in the offset flange portion 66a of the upper portion 58a of the flange 58 adjacent to the opening 60. The first tether attachment part 66 is spaced apart from the attachment parts 64. The purpose of the first tether attachment part 66 is described in greater detail below. The lower portion 58b of the flange 58 also includes an alignment opening 68.

The sub-trim panel 46 will now be described with specific reference to FIGS. 6 and 8-12. The sub-trim panel 46 has a finished trim surface 72 and an attachment surface 74 opposite the finished trim surface 72. With the sub-trim panel 46 installed to the main trim panel 44, the finished trim surface 72 approximately aligns and conforms to the design of the trim surface 50 of the main trim panel 44. Further, at least a portion of the finished trim surface 72 of the sub-trim panel 46 is flush with the trim surface 50 of the main trim panel 44 with the sub-trim panel 46 installed to the main trim panel 44. Further, with the sub-trim panel 46 installed to the main trim panel 44, the sub-trim panel 46 completely covers the flange 58. The sub-trim panel 44 has an opening 80 that extends from the finished trim surface 72 to the attachment surface 74. The opening 80 is sized and located such that with the interior trim assembly 14 installed to the door 12, the lever 40 of the door handle mechanism 38 is located and encircled by the edge of the sub-trim panel 44 that defines the opening 80, as shown in FIG. 2.

Figure 8:
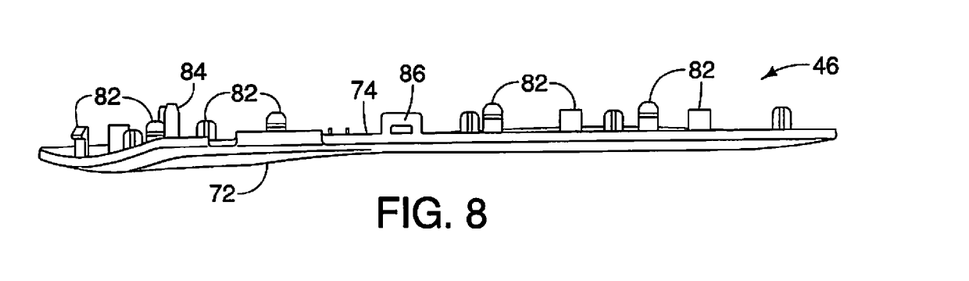
FIG. 8 is a top view of the sub-trim panel shown removed from the interior trim assembly in accordance with the first embodiment.
Figure 9:
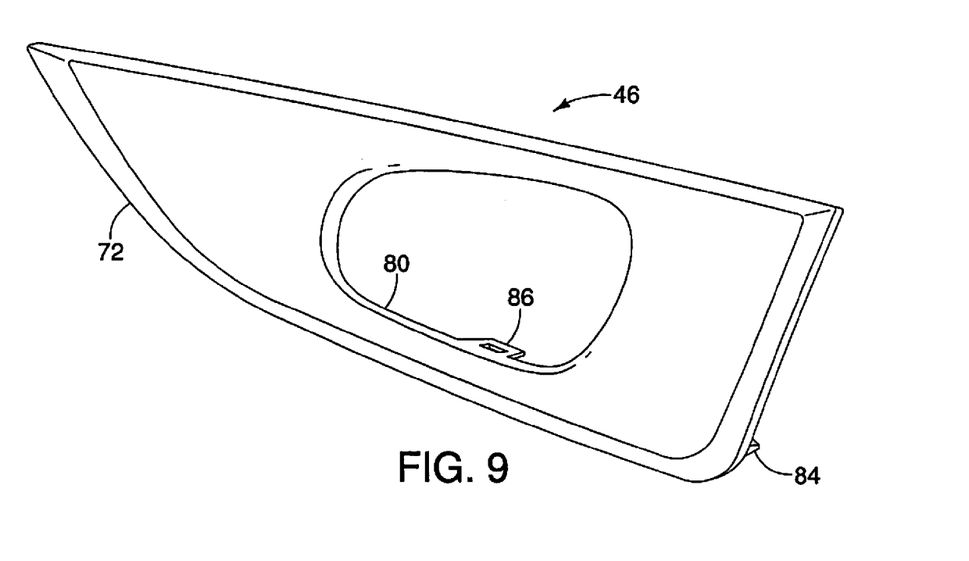
FIG. 9 is a perspective view of the sub-trim panel showing the finished trim surface of the sub-trim panel in accordance with the first embodiment.
Figure 10:
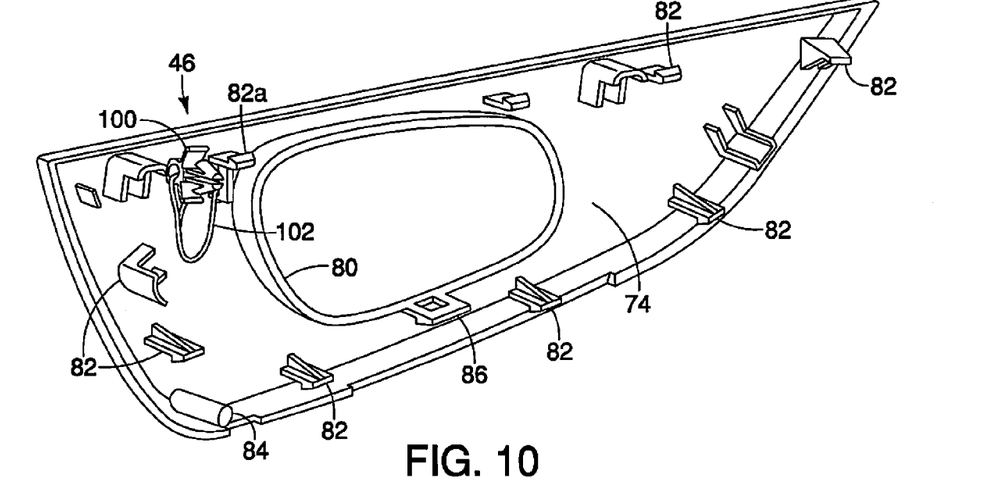
FIG. 10 is a perspective view of the sub-trim panel showing the attachment surface having a plurality of attachment projections and a tether attached thereto in accordance with the first embodiment.

As shown in FIGS. 6, 8 and 10, the attachment surface 74 of the sub-trim panel 46 includes a plurality of fastener parts 82, an alignment pin 84, a handle attachment projection 86 and a tether 88. The plurality of fastener parts 82 (also referred to herein below as third attachment parts) are dimensioned and positioned to extend into openings that define the attachment parts 64 and the recesses that define the attachment parts 64a of the flange 58 of the main trim panel 44 with the sub-trim panel 46 installed to the main trim panel 44. Each of the fastener parts 82 includes a snap-fitting projection that attach the sub-trim panel 46 to the main trim panel 44. The alignment pin 84 is positioned and dimensioned to fit into the alignment opening 68 in the lower portion 58b of the flange 58 of the main trim panel 44. The handle attachment projection 86 is configured and located to receive a snap-fitting projection (not shown) of the door handle mechanism 38 when the sub-trim panel 46 is installed to the main trim panel 44.

Figure 11:
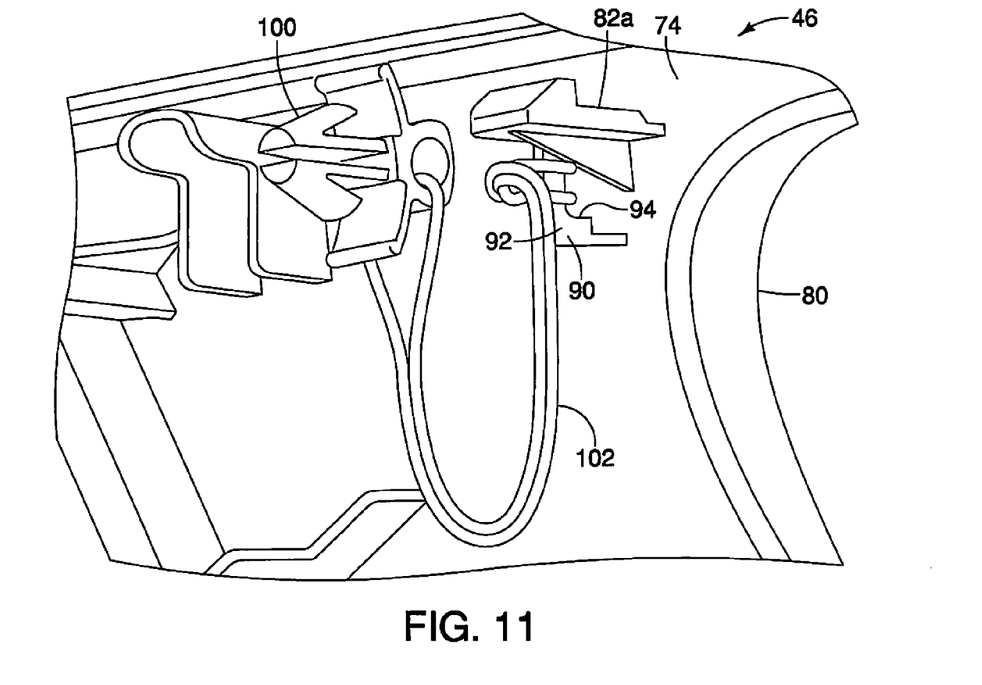
FIG. 11 is a perspective view of a portion of the attachment surface of the sub-trim panel showing a tether attachment part with the tether attached thereto in accordance with the first embodiment.

As shown in FIGS. 10 and 11, one of the plurality of fastener parts 82, specifically the fastener part 82a, includes a projecting flange 90 and a second tether attachment part 92 is at least partially defined by an aperture 94 formed in the projecting flange 90.

Figure 12:
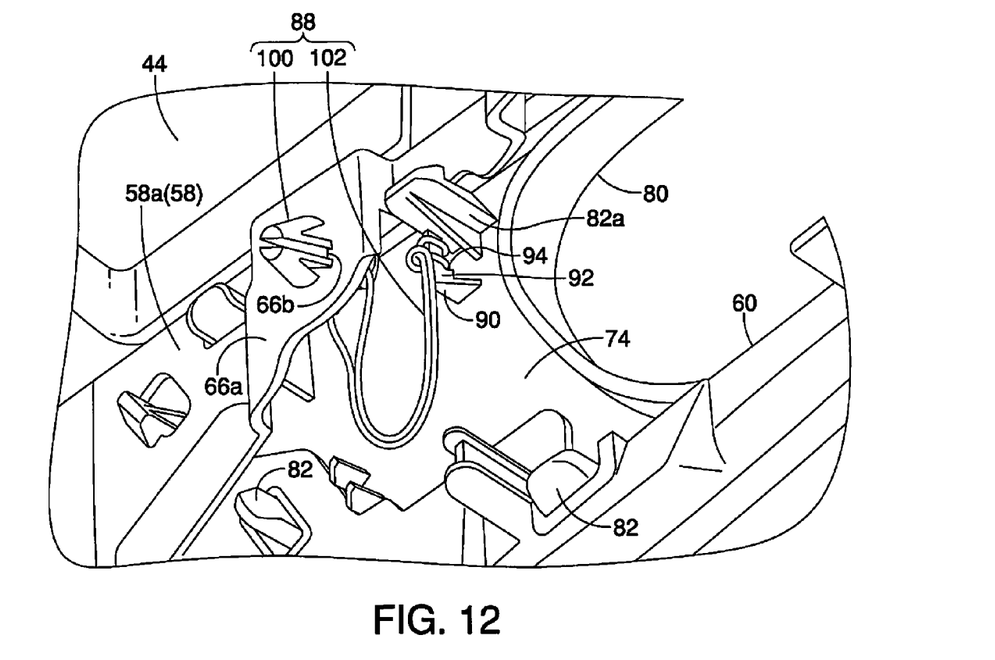
FIG. 12 is a perspective view of the interior trim assembly looking upward and showing the tether attachment parts of the main trim panel and the sub-trim panel with the tether attached thereto in accordance with the first embodiment.

As shown in the depicted embodiment in FIGS. 11 and 12, the tether 88 basically includes a fastener part 100 and a flexible loop material 102. The flexible loop material 102 extends through an aperture in the fastener part 100, thereby fixing the flexible loop material 102 to the fastener part 100. The fastener part 100 defines a first end of the tether 88 and the flexible loop material 102 defines a second end of the tether 88. In the depicted embodiment as shown in FIG. 12, the fastener part 100 (the first end) is a snap-fitting fastener that is inserted into the aperture 66b of the first tether attachment part 66 thereby fixing the tether 88 to the main trim panel 44. The flexible loop material 102 is a strong and preferably braided nylon, polymer material and/or woven metallic fiber material having a high tensile strength. The flexible loop material 102 (the second end) is looped through the aperture 94 such that a girth hitch or loop is formed around the second tether attachment part 92. However, it should be understood from the drawings and the description herein that the flexible loop material 102 can be provided with a mechanical fastener that attaches to the projecting flange 90 and the second tether attachment part 92 of the sub-trim panel 46.

When the sub-trim panel 46 is installed to the main trim panel 44, the sub-trim panel 46 covers and conceals the flange 58, the first tether attachment part 66 and the tether 88. Further, with the sub-trim panel 46 removed or un-installed from the main trim panel 44, but with the tether 88 connected to both the sub-trim panel 46 and the main trim panel 46, the tether 88 limits movement of the sub-trim panel 46 relative to the main trim panel 44.

Figure 13:
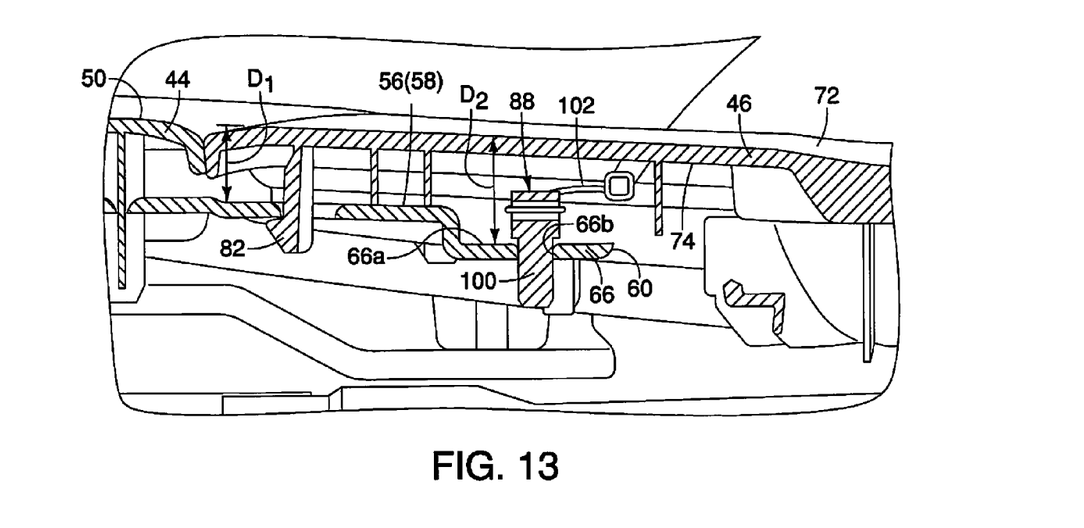
FIG. 13 is a cross-sectional view of the interior trim assembly taken along the line 13-13 in FIG. 4 in accordance with the first embodiment.
Figure 14:
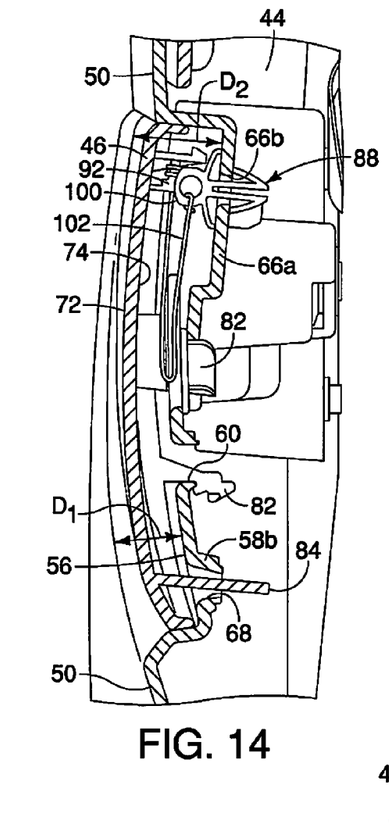
FIG. 14 is a cross-sectional view of the interior trim assembly taken along the line 14-14 in FIG. 4 showing the sub-trim panel attached to the main trim panel in accordance with the first embodiment.
Figure 15:
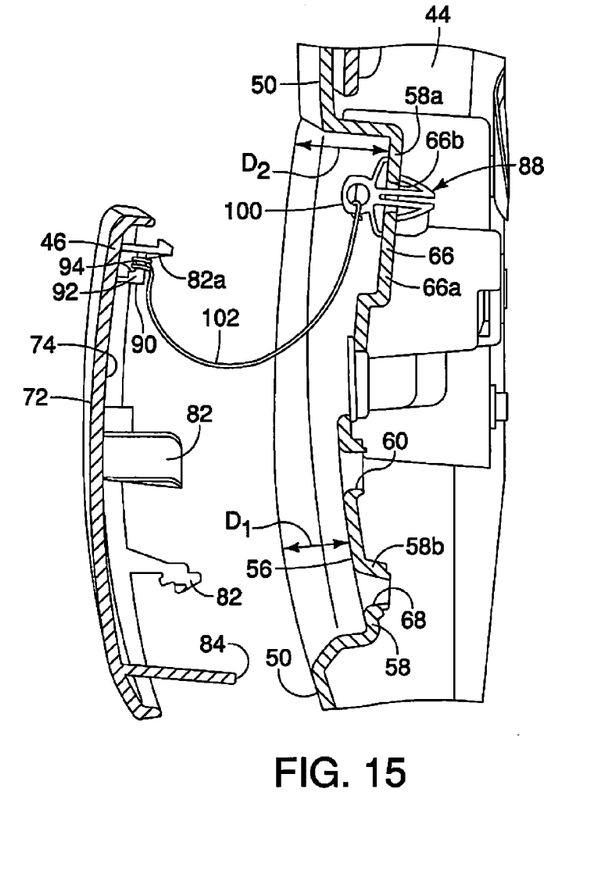
FIG. 15 is a cross-sectional view of the interior trim assembly similar to FIG. 15 showing the sub-trim panel detached from the main trim panel but connected to the main trim panel by the tether in accordance with the first embodiment.

As shown in FIGS. 13, 14 and 15, the recessed surface 56 of the flange 58 is spaced apart from the trim surface 50 of the main trim panel by a first distance $D_1$ and the first tether attachment part spaced apart from the trim surface of the main trim panel by a second distance $D_2$ that is greater than the first distance $D_1$.

It should be understood from the drawings, and in particular, that the left side of FIG. 14 and the trim surface 50 of the main trim panel 44 represent an inboard side of the interior trim assembly 14 and the right side of FIG. 14 is an outboard side of the interior trim assembly 14. As shown in FIG. 14, the recessed surface 56 of the flange 58 is located outboard of the trim surface 50 of the main trim panel 44. Further, the first tether attachment part 66 (and the aperture 66b) is located outboard of the recessed surface 56.

The design of the tether 88, the main trim panel 44 and the sub-trim panel 46 include many advantages. For example, as shown in FIG. 10, prior to installation of the sub-trim panel 46, the tether 88 can be easily installed to the second tether attachment part 92. Thereafter, the snap-fitting projection that defines the fastener part 100 of the tether 88 can be easily inserted into the aperture 66*b* that defines part of the flange 58 of the main trim panel 44. More specifically, as shown in FIGS. 5 and 7, the aperture 66*b* (the first tether attachment part 66) of the flange 58 of the main trim panel 44 is fully exposed with the sub-trim panel 46 removed. Since the aperture 66*b* is fully exposed, the snap-fitting projection of the fastener part 100 is easy to install. Thereafter, the sub-trim panel 46 can be installed to the main trim panel 44, completely covering the tether 88 and the flange 58.

As shown in FIGS. 14 and 15, in the event that the sub-trim panel 46 is removed from the main trim panel 44, the tether 88 allows the sub-trim panel 46 to undergo a limited amount of movement relative to the main trim panel 44, but prevents the sub-trim panel 46 from becoming completely detached from the main trim panel 44. For example, in the event of a side impact event on the exterior of the vehicle 10, if the sub-trim panel 46 should come loose from the main trim panel 44, the sub-trim panel 46 can only undergo limited movement relative to the main trim panel 44 due to the tether 88 remaining attached to the main trim panel 44.

The various parts and features of the vehicle 10 other than the interior trim assembly 14 are conventional components that are well known in the art. Since such vehicle components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the interior trim assembly. Accordingly, these terms, as utilized to describe the present invention should be interpreted relative to a vehicle equipped with the interior trim assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior trim assembly comprising:

a main trim panel having a trim surface and an attachment surface opposite the trim surface, the attachment surface including a plurality of first attachment parts configured to attach to an interior structure of a vehicle, the main trim panel also including a recessed surface that is spaced apart from the trim surface, the recessed surface defining a flange that at least partially surrounds an opening extending from the recessed surface to the attachment surface, the flange having a first tether attachment part and a plurality of second attachment parts;

a sub-trim panel having a finished trim surface and an attachment surface opposite the finished trim surface, the attachment surface including a second tether attachment part and a plurality of third attachment parts fixed to the second attachment parts of the flange of the main trim panel with the sub-trim panel installed to the main trim panel; and a tether having a first end attached to the first tether attachment part and a second end attached to the second tether attachment part, such that with the sub-trim panel installed to the main trim panel the sub-trim panel the covers and conceals the flange, the first tether attachment part and the tether, and with the sub-trim panel un-installed from the main trim panel the tether limits movement of the sub-trim panel relative to the main trim panel.

2. The vehicle interior trim assembly according to claim 1, wherein the finished trim surface of the sub-trim panel is flush with the trim surface of the main trim panel with the sub-trim panel installed to the main trim panel.

3. The vehicle interior trim assembly according to claim 1, wherein the first tether attachment part is an aperture formed in the flange adjacent to the opening that is spaced apart from the second attachment parts.

4. The vehicle interior trim assembly according to claim 1, wherein the recessed surface is spaced apart from the trim surface of the main trim panel by a first distance and the first tether attachment part spaced apart from the trim surface of the main trim panel by a second distance that is greater than the first distance.

5. The vehicle interior trim assembly according to claim 1, wherein the recessed surface of the flange is located outboard of the trim surface of the main trim panel, and the first tether attachment part is located outboard of the recessed surface.

6. The vehicle interior trim assembly according to claim 1, wherein at least one of the plurality of the third attachment parts includes a projecting flange and the second tether attachment part is at least partially defined by an aperture formed in the projecting flange.

7. The vehicle interior trim assembly according to claim 6, wherein
the tether includes a flexible loop material that extends through the aperture is secured to the second tether attachment part by a girth hitch.

8. The vehicle interior trim assembly according to claim 1, wherein
the first tether attachment part is defined by an aperture in a portion of the flange of the main trim panel, and
the first end of the tether includes a snap-fitting projection that is inserted into the aperture.

9. The vehicle interior trim assembly according to claim 8, wherein
the recessed surface is spaced apart from the trim surface of the main trim panel by a first distance and the portion of the flange that includes the aperture is spaced apart from the trim surface of the main trim panel by a second distance that is greater than the first distance.

10. The vehicle interior trim assembly according to claim 8, wherein
the recessed surface of the flange is located outboard of the trim surface of the main trim panel, and the portion of the flange that includes the aperture is located outboard of the recessed surface.

11. A vehicle interior trim assembly comprising:
a vehicle body structure having an interior surface;
a main trim panel having a trim surface and an attachment surface opposite the trim surface, the attachment surface including a plurality of first attachment parts attached to the interior surface of the vehicle body structure, the main trim panel also including a recessed surface that is located between the trim surface and the attachment surface, the recessed surface defining a flange that at least partially surrounds an opening extending from the recessed surface to the attachment surface, the flange having a first tether attachment part and a plurality of second attachment parts;
a sub-trim panel having a finished trim surface and an attachment surface opposite the finished trim surface, the attachment surface including a second tether attachment part and a plurality of third attachment parts fixed to the second attachment parts of the flange of the main trim panel with the sub-trim panel installed to the main trim panel; and
a tether having a first end attached to the first tether attachment part and a second end attached to the second tether attachment part, such that with the sub-trim panel installed to the main trim panel the sub-trim panel the covers and conceals the flange, the first tether attachment part and the tether, and with the sub-trim panel un-installed from the main trim panel the tether limits movement of the sub-trim panel relative to the main trim panel.

12. The vehicle interior trim assembly according to claim 11, wherein
the finished trim surface of the sub-trim panel is flush with the trim surface of the main trim panel with the sub-trim panel installed to the main trim panel.

13. The vehicle interior trim assembly according to claim 11, wherein
the first tether attachment part is an aperture formed in the flange adjacent to the opening that is spaced apart from the second attachment parts.

14. The vehicle interior trim assembly according to claim 1, wherein
at least one of the plurality of the third attachment parts includes a projecting flange and the second tether attachment part is at least partially defined by an aperture formed in the projecting flange.

15. The vehicle interior trim assembly according to claim 14, wherein
the tether includes a flexible loop material that extends through the aperture is secured to the second tether attachment part by a girth hitch.

16. The vehicle interior trim assembly according to claim 11, wherein
the first tether attachment part is defined by an aperture in a portion of the flange of the main trim panel, and
the first end of the tether includes a snap-fitting projection that is inserted into the aperture.

17. The vehicle interior trim assembly according to claim 11, wherein
the vehicle body structure is a vehicle door.

18. The vehicle interior trim assembly according to claim 17, further comprising
a door handle mechanism fixed to the interior surface of the vehicle door.

19. The vehicle interior trim assembly according to claim 18, wherein
the door handle mechanism includes a lever that is located within the opening of the main trim panel, and the sub-trim panel includes a second opening that is shaped and dimensioned to encircle the lever such that the lever is exposed with the sub-trim panel installed to the main trim panel.

* * * * *